3,496,180
HETEROCYCLIC BINUCLEAR N,N'-DIGLYCIDYL COMPOUNDS

Daniel Porret, Binningen, and Juergen Habermeier, Allschwil, Switzerland, assignors to Ciba Limited, Basel Switzerland, a Swiss company
No Drawing. Filed Jan. 14, 1969, Ser. No. 791,176
Claims priority, application Switzerland, Jan. 18, 1968, 759/68
Int. Cl. C07d 99/04; C08f
U.S. Cl. 260—256.4                              6 Claims

ABSTRACT OF THE DISCLOSURE

New heterocyclic binuclear N,N'-diglycidyl compounds of the formula

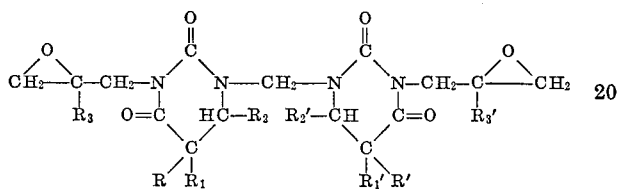

in which R, R', $R_1$, $R_1'$, $R_2$ and $R_2'$, independently of one another, represent a hydrogen atom or an aliphatic, cycloaliphatic, araliphatic or aromatic hydrocarbon residue each, especially a lower alkyl radical with 1 to 4 carbon atoms, and $R_3$ and $R_3'$ each represents a hydrogen atom or a methyl group and are resin precursors.

The present invention provides new heterocyclic binuclear N,N'-diglycidyl compounds of the formula
(I)

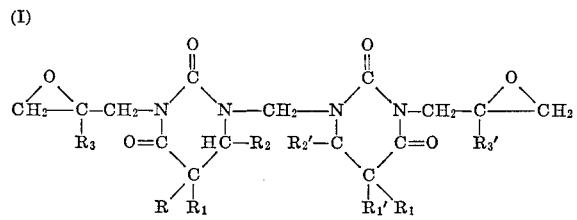

in which R, R', $R_1$, $R_1'$, $R_2$ and $R_2'$ independently of one another, represent a hydrogen atom or an aliphatic, cycloaliphatic, araliphatic or aromatic hydrocarbon residue each, especially a lower alkyl residue containing 1 to 4 carbon atoms, and $R_3$ and $R_3'$ each represents a hydrogen atom or the methyl group.

In the above formula one of the residues $R_1$, $R_2$ or $R_1'$, $R_2'$ preferably represents a hydrogen atom and the other a methyl group, or all residues R are hydrogen atoms.

The new diepoxides are manufactured by known methods. Preferably, in a compound of the formula
(II)

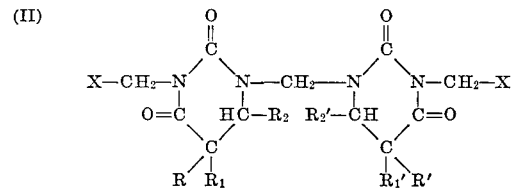

in which R, R', $R_1$, $R_1'$, $R_2$ and $R_2'$ have the above meanings and the residues X are residues convertible into 1,2-epoxyethyl groups, the residues X are so converted.

A residue X convertible in the 1,2-epoxyethyl residue is in the first place a hydroxy-halogenethyl residue which carries the functional groups on different carbon atoms, especially a 2-halogeno-1-hydroxyethyl residue or a 2-halogeno-1-hydroxy-1-methylethyl residue. The halogen atoms are especially chlorine or bromine atoms. The reaction is carried out in the usual manner, especially in the presence of an agent for binding a hydrohalic acid, such as a strong alkali, for example anhydrous sodium hydroxide or aqueous sodium hydroxide solution, though it is also possible to use other strongly alkaline reagents such as potassium hydroxide, barium hydroxide, calcium hydroxide, sodium carbonate or potassium carbonate.

Another residue X convertible into the 1,2-epoxyethyl group is, for example, the ethenyl residue, which can be converted in known manner into the 1,2-epoxyethyl group preferably by reaction with hydrogen peroxide or a peracid, for example peracetic, perbenzoic or monoperphthalic acid.

The starting materials of the Formula II are obtained in known manner; thus for instance a bis-dihydro-uracil of the formula
(III)

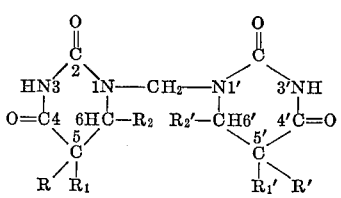

(in which R, R', $R_1$, $R_1'$, $R_2$, $R_2'$ have the above meanings) can be reacted with a compound of the formula X—$CH_2$—Hal, where Hal represents a halogen atom and X has the above meaning. The compound of the Formula III is preferably reacted with an epihalohydrin or β-methylepihalohydrin, especially epichlorohydrin or β-methylepichlorohydrin, in the presence of a catalyst, especially a tertiary amine, a quaternary ammonum base or a quaternary ammonium salt. As catalysts specially suitable for the additive reaction with epichlorohydrin or β-methylepichlorohydrin there may be mentioned in the first place tertiary amines such as triethylamine, tri-n-propylamine, benzyldimethylamine, N,N'-di-methylaniline and triethanolamine; quaternary ammonium bases such as benzyl trimethyl ammonium hydroxide; quaternary ammonium salts such as tetramethyl ammonium chloride, tetraethyl ammonium chloride, benzyl trimethyl ammonium chloride, benzyl trimethyl ammonium acetate, methyl triethyl ammonium chloride; hydrazines containing a tertiary nitrogen atom such as 1,1-dimethylhydrazine, which may also be used in a quaternated form; alkali metal salts such as lithium chloride, potassium chloride, sodium chloride, bromide or fluoride; also ion exchange resins containing tertiary or quaternary amino groups, as well as ion exchange resins containing acid amide groups. Basic impurities which may occur in commercial grades of the starting compounds (III) likewise act as catalysts; in such cases a special catalyst can be dispensed with.

The invention includes also any variant of the process in which an intermediate obtained at any stage thereof is used as starting material and any remaining steps are carried out, or a starting material is formed under the reaction conditions or is further worked up without isolation.

Therefore, according to a preferred variant of the process, for example, an epihalohydrin or β-methylepihalohydrin, preferably epichlorohydrin or β-methylepichlorohydrin, is reacted in the presence of a catalyst, preferably a tertiary amine, a quaternary ammonium base or a quaternary ammonium salt, with a compound of the Formula III and in a second process step the resulting product containing halohydrin groups is treated with a dehydrohalogenating agent. These reactions are carried out as described above, using as catalyst for the additive reaction with epichlorohydrin or β-methylepichlorohydrin, and for the dehydrohalogenation respectively, the compounds mentioned above. Particularly good yields are obtained by using an excess of epichlorohydrin or β-methylepichlorohydrin. During the first reaction, before the alkali is added, a partial epoxidation of dichlorohydrin or dichloro-β-methylhydrin of the bis-dihydrouracil occurs. The epichlorohydrin or β-methylepichlorohydrin, which act as hydrogen chloride acceptors, have then been partially converted into glycerol dichlorohydrin or β-methylglycerol dichlorohydrin respectively.

The starting compounds of the Formua III are obtained readily and in good yields by condensing 2 mols of a 5,6-dihydrouracil of the formula (IV)

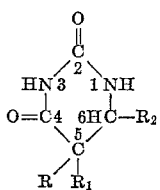

in which R, $R_1$ and $R_2$ have the same meanings as in Formula I with 1 mol of formaldehyde in an acidic medium.

As 5,6-dihydrouracils of the Formula IV there may be mentioned, for example: 5,6-dihydrouracil and 6-methyl-5,6-dihydrouracil, 6-phenyl-5,6-dihydrouracil, 6-isopropyl-5,6-dihydrouracil and 5,5-dimethyl-5,6-dihydrouracil.

The 1,1′-methylene-bis-dihydrouracils of the Formula III have not yet been described in the literature. Accordingly, the present invention includes also this type of new compounds.

As intermediates for the manufacture of the heterocyclic N,N′-diglycidyl compounds of this invention there may be mentioned in the first place 1,1′-methylene-bis-(5,6-dihydrouracil) and 1,1′-methylene-bis-(6-methyl-5,6-dihydrouracil).

The new N,N′-diglycidyl and N,N′-di-(β-methylglycidyl) compounds obtained therefrom by an additive reaction with epihalohydrin or β-methylepihalohydrin by the process described above are colourless crystalline powders of the following structure (V)

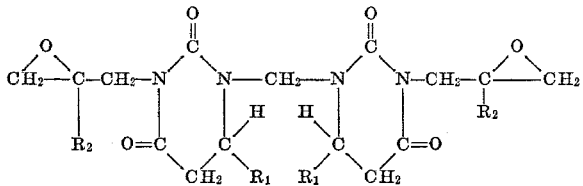

in which $R_1$ and $R_2$ each represents a hydrogen atom or a methyl group.

The diepoxides of the Formula I obtained according to this invention react with the conventional curing agents for epoxy compounds. Therefore, they can be crosslinked or cured by the addition of such curing agents in the same way as other polyfunctional epoxy compounds. As such curing agents both basic and acidic compounds are suitable.

The following have proved suitable: Amines or amides such as aliphatic and aromatic primary, secondary and tertiary amines, for example m-phenylenediamine, p-phenylenediamine, bis-(p-aminophenyl)-methane, ethylenediamine, hexamethylenediamine, trimethylhexamethylenediamine, N,N-diethylethylenediamine, diethylenetriamine, tetra-(hydroxyethyl)-diethylenetriamine, triethylenetetramine, N,N - dimethylpropylenediamine, bis - (4-aminocyclohexyl) - dimethylmethane, 3,5,5 - trimethyl-3-(aminomethyl)-cyclohexylamine; Mannich's bases such as 2,4,6-tris - (dimethylaminomethyl) - phenol; dicyandiamide, melamine, cyanuric acid; urea-formaldehyde resins, melamine-formaldehyde resins; polyamides, for example those prepared from aliphatic polyamines and dimerized or trimerized unsaturated fatty acids; polyhydric phenols, for example resorcinol, bis-(4-hydroxyphenyl)--dimethylmethane; phenolformaldehyde resins; reaction products of aluminum alcoholates or phenolates with compounds of tautomeric reaction of the type of acetoacetic esters; Friedel-Crafts catalysts, for example $AlCl_3$, $SbCl_4$, $ZnCl_2$, $BF_3$ and their complexes with organic compounds, for example $BF_3$-amine complexes; metal fluoroborates such as zinc fluoroborate; phosphoric acid, boroxines such as trimethoxyboroxine; polybasic carboxylic acids and their anhydrides, for example phthalic anhydride, $\Delta^4$-tetrahydrophthalic anhydride, hexahydrophthalic anhydride, 4 - methyl - hexahydrophthalic anhydride, 3,6 - endomethylene - $\Delta^4$ - tetrahydrophthalic anhydride, 4-methyl-3,6-endomethylene-$\Delta^4$-tetrahydrophthalic anhydride (=methylnadic anhydride), 3,4,5,6,7,7 - hexachloro-3,6-endomethylene-$\Delta^4$-tetrahydrophthalic, succinic, adipic, maleic, azelaic, allylsuccinic, dodecenylsuccinic anhydride; 7-allyl-bicyclo(2.2.1)-hept-5-ene-2,3-dicarboxylic anhydride, pyromellitic dianhydride or mixtures of such anhydrides.

If desired, the anhydride curing operation may be performed with additional use of an accelerator such as a tertiary amine, or a salt or quaternary ammonium compound thereof, for example 2,4,6-tris-(dimethylaminomethyl)-phenol, benzyl dimethylamine or benzyl dimethylammonium phenolate, $tin^{II}$-salts of carboxylic acids such as $tin^{II}$-octoate or alkali metal alcoholates, for example sodium hexylate.

The curing of the polyepoxides of this invention with anhydrides is preferably performed with the use of 0.5 to 1.1 gram equivalents of anhydride groups for every 1 gram equivalent of epoxide groups.

The term "curing" as used in this context refers to the conversion of the above-mentioned diepoxides into insoluble and infusible crosslinked products, as a rule with simultaneous shaping to furnish shaped structures such as castings, mouldings laminates or flat two-dimensional structures such as coatings, lacquer films or adhesive bonds.

If desired, the viscosity of the diepoxides of this invention can be reduced by adding an active diluent, for example butylglycide, cresylglycide or 3-vinyl-2,4-dioxaspiro(5.5)-9,10-epoxyundecane.

Furthermore, the diepoxides of this invention can be used in mixtures with other curable diepoxy or polyepoxy compounds, for example polyglycidyl ethers of polyhydric alcohols or especially of ployhydric phenols, such as resorcinol, bis-(4-hydroxyphenyl)-dimethylmethane (=bisphenol A), bis - (4-hydroxyphenyl)-sulphone or condensation products of formaldehyde with phenols (novolaks); furthermore di- and poly(β-methylglycidyl) ethers of the above-mentioned polyalcohols and polyphenols; polyglycidyl esters of polycarboxylic acids, for example phthalic acid diglycidyl ester or hexahydrophthalic acid diglycidyl ester; triglycidyl isocyanurate; aminopolyepoxides as obtained by dehydrohalogenating the reaction products of epihalohydrin and primary or secondary amines such as aniline or 4,4′-diaminodiphenylmethane, as well as alicyclic compounds containing several epoxide groups such as epoxyethyl-3,4-epoxycyclohexane (=vinylcyclohexene diepoxide), dicyclopentadiene diepoxide, ethyleneglycol-bis-(3,4-epoxy-tetrahydrodicyclopentadien-8-yl)-ether, 3,4-epoxy-tetrahydro - dicyclopentadienyl-8-glycidyl ether, (3′,4′-epoxy-cyclohexylmethyl)3,4-epoxy - cyclohexanecarboxylate, (3′,4′-epoxy-6′-methyl-cyclohexylmethyl)-3,4-epoxy-6-methyl - cyclohexanecarboxylate, bis-(cyclopentyl)-ether diepoxide or 3-(3′,4′-epoxy-cyclohexyl) - 2,4 - dioxaspiro(5.5)-9,10-epoxyundecane.

Accordingly, the present invention includes also curable mixtures suitable for the manufacture of shaped structures, including flat two-dimensional structures, and which contain the diepoxides of this invention, if desired in conjunction with other diepoxides or polyepoxides and also curing agents for epoxy resins such as polyamines or polycarboxylic acid anhydrides.

The diepoxy compounds of this invention and their mixtures with other polyepoxy compounds and/or curing agents may, furthermore, be admixed at any phase before the curing with extenders, fillers or reinforcing agents, softeners, pigments, dyestuffs, flameproofing agents and/or mould release agents.

Suitable extenders, fillers and reinforcing agents are, for example, asphalt, bitumen, glass fibres, boron fibres, carbon fibres, cellulose, mica, quartz meal, aluminium hydroxide, gypsum, kaolin, ground dolomite, silica-aerogel (Aerosil) or metal powders, such as aluminium powder.

The curable mixtures may be used in the unfilled or filled state, if desired in form of solutions or emulsions, as laminating resins, paints, lacquers, dipping resins, impregnating resins, casting resins, moulding compositions, sinter powders, grouting and sealing compositions, flooring compositions, potting and encapsulating compositions for insulating purposes in the electrical industry, as adhesives and for the manufacture of such products.

The mixtures of the diglycidyl compounds of the Formula V with polyamines or polycarboxylic acid anhydrides are especially highly reactive resin+curing agent systems and, by virtue of its crystallinity, the resin component may be used not only as casting resin, electro-resin or laminating resin but also in fluidized bed sinter powders.

Cured mouldings of these resins combine good mechanical properties with good thermal stability and good electric properties.

Parts and percentages in the following examples are by weight.

MANUFACTURING EXAMPLES

Example 1

(a) Manufacture of 1,1'-methylene-bis-(5,6-dihydrouracil).—A homogeneous mixture of 1177.0 g. of 5,6-dihydrouracil (2,4-dihydroxy-5,6-dihydropyrimidine) (10.32 mols) and 2580.0 ml. of concentrated hydrochloric acid (of 37% strength) is vigorously stirred at room temperature. Within 10 minutes 386.8 g. of formaldehyde solution (of 40% strength=5.16 mols) are dropped in, during which the temperature rises by about 10 to 15° C. The white-grey suspension is stirred on for 60 minutes and then kept overnight, then neutralized by dropping in saturated sodium carbonate solution and the product is filtered off, washed free from salt with cold water and then rinsed with a small quantity of ethanol, and the colourless, finely crystalline product is dried at 110° C. The yield of dry product amounts to 857.3 g. (=69.4% of theory); it melts at 328° C. with decomposition. On recrystallization of a specimen from dimethylsulphoxide colourless, small crystals are obtained which melt at 344 to 345° C. with decomposition.

The elementary analysis reveals the following values—Found: C, 44.94%; H, 5.09%; N, 23.39%. Calculated: C, 45.00%; H, 5.04%; N, 23.33%.

Furthermore, the mass spectrum reveals the presence of 1,1'-methylene-bis-(5,6-dihydrouracil) by m/e signals at 240, 169, 149, 128, 127, 126, 113 and so on.

(b) Glycidylation.—A mixture of 525 g. of 1,1'-methylene-bis-(5,6-dihydrouracil) [prepared as described in Example 1a] (2.185 mols), 10,013 g. of epichlorohydrin and 3.63 g. of tetraethylammonium chloride (1 mol percent) is heated to 116–120° C. with vigorous stirring. After 11 hours' reaction the batch is cooled to 60° C. and while stirring vigorously 546 g. of finely powdered solid sodium hydroxide are added within 30 minutes.

After the alkali addition the batch is stirred on for 20 minutes at 60° C. and then distilled at 60° C. under about 40 mm. Hg pressure with vigorous stirring until all water resulting from the reaction has been azeotropically removed. The salt formed is then filtered off the solution and washed with a small quantity of epichlorohydrin. The combined epichlorohydrin solutions are then concentrated at 60° C. under a water-jet vacuum until no more epichlorohydrin passes over. The residue is then treated under 0.2 mm. Hg until the last remnants of soluble material have been expelled.

There are obtained 513 g. of a pale yellow, liquid resin (=67.0% of theory) which crystallizes on cooling. It contains 5.18 epoxide equivalents per kg. (=91.4% of theory). A specimen of the crude 3,3'-diglycidyl-1,1'-methylene-bis(5,6-dihydrouracil is recrystallized from methanol. The colourless, glossy, small crystals melt at 106–107° C. and contain 5.45 epoxide equivalents per kg., corresponding to 96% of theory. The elementary analysis reveals the following values—Found: C, 51.00%; H, 5.80%; N, 15.95%. Calculated: C, 51.13%; H, 5.72%; N, 15.90%.

Vapour pressure osmosis reveals a molecular weight of 357 (theory: 352.3). The H-NMR (nuclear magnetic resonance) spectrum indicates by signals at 5.1, 4.2, 4.0–3.5, 3.0, 2.8–2.5 and 2.0 p.p.m. the presence of the substance.

Example 2

(a) Manufacturing 1,1(-methylene-bis-(6 - methyl-5,6-dihydrouracil).—A homogeneous mixture of 20.0 g. of 6-methyl-5,6-dihydrouracil [2,4-dihydroxy - 6-methyl-5,6-dihydropyrimidine] (0.156 mol.), 2.5 g. of paraformaldehyde (0.078 mol.), and 11.7 ml. of concentrated hydrochloric acid is vigorously stirred at room temperature. In the course of 30 minutes the mixture heats up spontaneously to about 45° C., and is then stirred on for 30 minutes while being heated at 70° C. The mixture is kept overnight, 150 ml. of water are stirred in and the whole is filtered. The pure white, finely crystalline substance is washed with cold water until the washing water runs neutral. Drying at 120° C. furnishes 16.0 g. of 1,1'-methylene-bis-(6-methyl-5.6-dihydrouracil) (=72.1% of theory) melting at 288–290° C. A specimen recrystallized from water forms colourless flakes melting at 289–290° C,. whose elementary analysis reveals the following values.—Found: C, 49.16%; H, 6.03%; N, 20.92%. Calculated: C, 49.25%; H, 6.01%; N, 20.89%.

(b) Glycidylation.—A mixture of 6.67 g. (0.025 mol.) of 1,1'-methylene-bis-(6-methyl-5,6-dihydrouracil) [prepared as described in Example 2a], 92.5 g. of epichlorohydrin (1 mol., corresponding to 20 mols. per mol. NH) and 0.041 g. of tetraethyl ammonium chloride (1 mol. %) is stirred for 6 hours while being heated at 115–117° C., then cooled to 60° C. and 2.2 g. of finely powdered solid sodium hydroxide (0.055 mol.) are entered in small portions within 30 minutes with vigorous stirring. Working up according to Example 1b furnishes 8.7 g. (=92.3% of theory) of a thinly liquid, colourless resin which on cooling forms small colourless crystals. It contains 5.15 epoxide equivalents per kg. (=98.0% of theory) and melts at 121–122° C. A specimen was recrystallized from methanol. After one recrystallization 3,3'-diglycidyl-1,1'-methylene-bis-(6-methyl-5,6-dihydrouracil) melts at 128 129° C.; it contains 5.19 epoxide equivalents per kg. (= 98.8% of theory) and 0.5% of chlorine, and its elementary analysis reveals—Found: C, 53.48%; H, 6.37%; N, 14.60%. Calculated: C, 53.67%; H, 6.36%; N, 16.73%.

The colourless crystals are readily soluble in methanol, ethanol, acetone and chloroform. Its solubility in water at 20° C. is about 15 g./litre, and at 90° C. about 150 g./litre.

The infrared spectrum reveals the absence of the NH-frequences and the new absorptions of the epoxide groups.

Example 3

(a) Manufacturing 1,1'-methylene-bis-(5,5-dimethyl-5,6-dihydrouracil).—A homogenous suspension of 42.6 g. (0.3 mol.) of 5,5-dimethyl-5,6-dihydrouracil (2,4-dihydroxy-5,5-dimethyl-5,6-dihydropyrimidine), 75 ml. of concentrated hydrochloric acid of 37% strength and 11.3 g. of formaldehyde solution of 40% strength is vigorously stirred for 3 hours at room temperature without heating or cooling, during which the temperature may rise to about 30° C. The reaction mixture is kept overnight and then adjusted to a pH value of about 6 by adding sodium hydroxide solution of 50% strength.

The colourless product is rapidly suctioned off, rinsed with about 600 ml. of cold water to remove sodium chloride and dried, to yield as crude product 38.1 g. of white crystals (=85.8% of theory, melting at 207–210° C.

The product is purified by recrystallization from ethanol, to yield analytically pure 1,1'-methylene-bis-(5,5-dimethyl-5,6-dihydrouracil) melting at 222–223° C.

Combustion analysis reveals.—Found: C, 52.70%; H, 6.79%; N, 19.04%. Calculated: C, 52.69%; H, 6.80%; N, 18.91%.

Infrared and H-NMR (nuclear magnetic resonance) spectra prove the following structure:

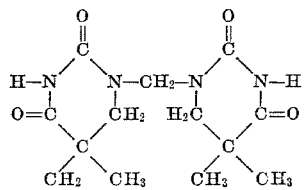

(b) Glycidylation.—A mixture of 59.2 g. (0.2 mol.) of 1,1'-methylene-bis-5,5-dimethyl-5,6 - dihydrouracil) [prepared according to Example 3a], 740.0 g. (8 mols.) of epichlorohydrin and 1.33 g. (4 mol. %) of tetraethyl ammonium chloride is stirred for 2½ hours at 90° C. The reaction mixture is a clear, colourless solution. The mixture is cooled to 60° C. and another 0.66 g. of tetraethyl ammonium chloride is added. Then, while stirring vigorously under a weak vacuum at 60° C. 43.2 g. (0.54 mol.) of 50% aqueous sodium hydroxide solution are dropped in within 1 hour, while at the same time removing the water present in the reaction mixture from it by azeotropic circulation distillation. The batch is cooled to room temperature and the sodium chloride formed is filtered off. The clear solution is freed from catalyst residues by being washed with 150 ml. of water. The epichlorohydrin solution is concentrated at 60° C. bath temperature under a water-jet vacuum until epichlorohydrin no longer passes over. The resin formed is then treated under 0.1 mm. Hg pressure at 60° C. until the last remnants of volatile matter have been expelled.

A faintly yellowish, viscous epoxy resin containing 4.91 epoxide equivalents per kg. (=100% of theory) is obtained in a 100% yield of 81.6 g.

In reactions with dicarboxylic acid anhydrides this resin is found to be more reactive than the products prepared in Examples 1 and 2. It can be cured at as low a temperature as 80° C.

Example 4

Manufacturing 3,3' - di-(β-methylglycidyl)-1,1'-methylene-bis-(5,6-dihydrouracil.)—A mixture of 60.1 g. (0.25 mol) of 1,1'-methylene-bis-(5,6-dihydrouracil) [prepared as described in Example 1a], 7.9 g. of tetraethyl ammonium bromide and 1065.5 g. (10 mols) of β-methylepichlorohydrin is stirred for 36 hours at 122–125° C. The initially opaque, white suspension passes into a light-yellow, almost clear solution during this time.

Then, while stirring vigorously, 34.0 g. (0.87 mol) of finely powdered caustic soda are added within 30 minutes at 60° C. The batch is stirred on for 20 minutes at 60° C., and then the water of reaction together with β-methylepichlorohydrin is distilled off azeotropically at 60° C. under diminished pressure. The mixture is cooled to room temperature and the sodium chloride is filtered off. The crystals of sodium chloride are rinsed with 100 ml. of β-methylepichlorohydrin. The combined β-methylepichlorohydrin solutions are agitated with 80 ml. of water, separated from the aqueous phase and concentrated at 60° C. under 20 mm. Hg pressure. Finally, to remove the last traces of volatile matter, the product is treated at 60° C. under 0.05 mm. Hg pressure until its weight remains constant.

Yield: 90.8 g. (=95.5% of theory) of crude 3,3'-di-(β - methylglycidyl) - 1,1'-methylene-bis-(5,6-dihydrouracil) in form of a pale yellow, viscous resin containing 4.65 epoxide equivalents per kg. (=88.6% of theory).

When the resin is triturated with methanol, it crystallizes in the form of small, colourless crystals melting at 99–101° C.

The elementary analysis of the crystalline crude product receals the following data—Found: C, 53.43%; N, 14.87%; Cl, 0.5%. Calculated: V, 53.96%; N, 14.81%; Cl, 0.00%.

The product can be further purified by recrysallization from methanol, whereupon it melts at 100.5–101.5° C., contains 4.90 epoxide equivalents per kg. (=93.5% of theory) and its infrared spectrum contains in addition to the adsorptions of the dihydrouracil rings the absorptions caused by the epoxide functions; the absorptions of the —N—H— groupings at 3.05 to 3.20μ are absent; this proves the structure:

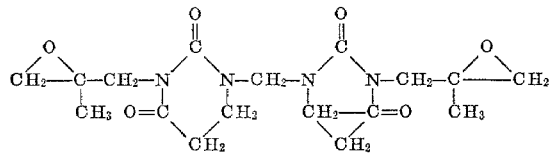

EXAMPLE OF APPLICATION 26 parts by weight of 3,3'-diglycidyl-1,1'-methylene-bis-(6-methyl-5,6-dihydrouracil) [prepared as described in Example 2b] are melted with stirring, and 24 parts by weight of an anhydride curing agent mixture, which is liquid at room temperature, containing 9 parts of phthalic anhydride, 13 parts of tetrahydrophthalic anhydride, 78 parts of hexahydrophthalic anhydride and 15 parts of cresylglycide are rapidly stirred into the melt. The hot mixture is degassed for a short time under vacuum and then poured into aluminum moulds. Curing is performed for 5 hours at 120° C. and then for 14 hours at 150° C., to form glass-clear, pale yellow mouldings having a heat distortion point according to Martens (DIN 53,458) of 137° C.

When in the above example 3,3'-diglycidyl-1,1'-methylene-bis-(6-methyl-5,6-dihydrouracil) is replaced by an equal quantity of 3,3'-diglycidyl-1,1'-methylene-bis-(5,6-dihydrouracil) [prepared according to Example 1b], the resulting mouldings are likewise only slightly coloured and possess good electrical and mechanical properties.

What we claim is:

1. A heterocyclic binuclear N,N'-diglycidyl compound of the formula

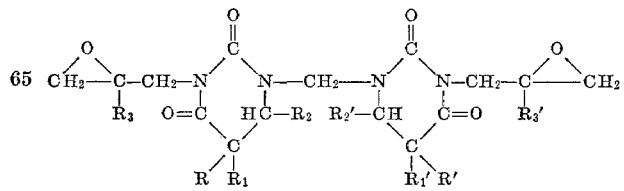

in which R, R', $R_1$, $R_1'$, $R_2$ and $R_2'$ each represents a number selected from the group consisting of hydrogen tom and lower alkyl with 1 to 4 carbon atoms, and $R_3$ and $R_3'$ each are members selected from the group consisting of hydrogen atom and the methyl group.

2. A heterocyclic binuclear N,N'-diglycidyl compound of the formula

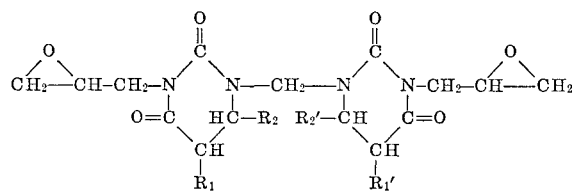

in which $R_1$, $R_1'$, $R_2$ and $R_2'$, each represents a member selected from the group consisting of hydrogen atom and lower alkyl radical with 1 to 4 carbon atoms.

3. 3,3' - diglycidyl - 1,1' - methylene-bis-(5,6-dihydrouracil).

4. 3,3' - diglycidyl - 1,1' - methylene-bis-(6-methyl-5,6-dihydrouracil).

5. 3,3' - diglycidyl - 1,1' - methylene-bis-(5,5-dimethyl-5,6-dihydrouracil).

6. 3,3' - di - ($\beta$ - methylglycidyl)-1,1'-methylene-bis-(5,6-dihydrouracil).

References Cited

UNITED STATES PATENTS 3,360,523  12/1967  Loux _____ 260—260

ALEX MAZEL, Primary Examiner

A. M. TIGHE, Assistant Examiner

U.S. Cl. X.R.

260—2